US009117243B2

United States Patent
Krautter et al.

(10) Patent No.: US 9,117,243 B2
(45) Date of Patent: *Aug. 25, 2015

(54) AUTOMATED SYSTEM AND METHOD FOR PROVIDING LEASE PAYMENT INFORMATION TO CONSUMERS VIA THE INTERNET

(75) Inventors: William F. Krautter, Austin, TX (US); Jerry Thompson, Georgetown, TX (US)

(73) Assignee: LeaseASP, Joint Venture, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,927

(22) Filed: Jun. 13, 2012

(65) Prior Publication Data

US 2012/0254003 A1 Oct. 4, 2012

Related U.S. Application Data

(63) Continuation of application No. 11/089,675, filed on Mar. 25, 2005, now Pat. No. 8,209,247.

(51) Int. Cl.
*G06Q 40/00* (2012.01)
*G06Q 40/02* (2012.01)
*G06Q 20/10* (2012.01)
*G06Q 20/40* (2012.01)
*G06Q 30/06* (2012.01)

(52) U.S. Cl.
CPC ............... *G06Q 40/02* (2013.01); *G06Q 20/10* (2013.01); *G06Q 20/40* (2013.01); *G06Q 30/0601* (2013.01); *G06Q 40/00* (2013.01)

(58) Field of Classification Search
USPC .......................................................... 705/38
See application file for complete search history.

(56) References Cited

U.S. PATENT DOCUMENTS

| 6,041,310 | A | 3/2000 | Green et al. |
| 6,208,979 | B1 | 3/2001 | Sinclair |
| 6,263,322 | B1 | 7/2001 | Kirkevold et al. |
| 6,502,080 | B1 | 12/2002 | Eichorst et al. |
| 6,622,129 | B1 | 9/2003 | Whitworth |
| 6,965,874 | B2 | 11/2005 | Joseph |
| 7,249,322 | B2 | 7/2007 | Jones et al. |
| 7,860,764 | B1 * | 12/2010 | Alexander et al. ............... 705/35 |
| 2001/0034700 | A1 | 10/2001 | Foss et al. |

(Continued)

OTHER PUBLICATIONS

IEEE 100 The Authoritative Dictionary of IEEE Standards Terms Seventh Edition.*

(Continued)

*Primary Examiner* — Zeshan Qayyum
(74) *Attorney, Agent, or Firm* — Blank Rome LLP

(57) ABSTRACT

A system and method of providing payment information for a lease of a specific vehicle in a vehicle dealer's inventory to a consumer via an Internet website of a dealer service is disclosed. A lease service obtains data via the Internet from the dealer service. The data is stored in a database associated with an Internet website and includes vehicle data, lease data, and consumer data. The lease service determines a residual value of the vehicle and obtains lease funding information from one or more third parties. The lease service then determines lease payment information and generates a disclosure webpage of the lease payment information. The disclosure webpage is formatted to comply with the Regulation "M" disclosure notice for vehicle lease payments. The consumer is allowed to view the disclosure webpage from the Internet website before committing to the lease.

24 Claims, 6 Drawing Sheets

(56) References Cited

U.S. PATENT DOCUMENTS

| | | | |
|---|---|---|---|
| 2002/0065707 A1 | 5/2002 | Lancaster et al. | |
| 2002/0082860 A1* | 6/2002 | Johnson | 705/1 |
| 2002/0099618 A1* | 7/2002 | Stiberman | 705/26 |
| 2002/0116328 A1* | 8/2002 | Bird et al. | 705/38 |
| 2002/0123961 A1 | 9/2002 | Stoyanov et al. | |
| 2003/0046199 A1 | 3/2003 | Murase et al. | |
| 2004/0059595 A1 | 3/2004 | Hoffmann | |
| 2004/0117287 A1* | 6/2004 | Wang | 705/36 |
| 2004/0128320 A1* | 7/2004 | Grove et al. | 707/104.1 |
| 2004/0236587 A1 | 11/2004 | Nalawade | |
| 2006/0080241 A1 | 4/2006 | Comstock | |
| 2007/0050387 A1* | 3/2007 | Busey | 707/101 |

OTHER PUBLICATIONS

Kelly Blue Book via internet Archive (http:llweb.archive.orglweb1200409131013091www.800bluebook.comlproducts bb newcar.aspx?nav=l&section=residua.*

IEEE 100 The Authoritative Dictionary of IEEE Standards Terms Seventh Edition Published:. Dec. 2000.*

Kelly Blue Book via internet Archive (http:llweb.archive.orglweb1200409131013091www.800bluebook.comlproducts bb newcar.aspx?nav=l&section=residua Sep. 2004.*

Internet Archive Wayback Machine for "www.frontrowcards.com," generated from http://web.archive.org on Jun. 17, 2008, 2-pgs.

FrontRowCars.com, representative archived webpage obtained from entry on http://web.archive.org dated Nov. 29, 2002, copyrighted 2002, 2-pgs.

FrontRowCars.com, representative archived webpage obtained from entry on http://web.archive.org dated Feb. 4, 2003, copyrighted 1995-2002, 2-pgs.

FrontRowCars.com, representative archived webpage obtained from entry on http://web.archive.org dated Mar. 19, 2003, copyrighted 2003, 2-pgs.

FrontRowCars.com, representative archived webpage obtained from entry on http://web.archive.org dated Apr. 1, 2003, copyrighted 2003, 1-pg.

FrontRowCars.com, representative archived webpage obtained from entry on http://web.archive.org dated Apr. 1, 2003, copyrighted 2003, 3-pgs.

"Instant Car Lease Quotes from LeaseCompare.com," obtained from http://www.leasecompare.com/, generated Mar. 7, 2005, 14-pages.

"ADP w.e.b.Desking," obtained from http://www.adpwebdesking.com/, generated Nov. 24, 2004, 4-pages.

"LeaseLink," obtained from http://www.leaselink.com/, generated Nov. 24, 2004, 4-pages.

"Printable Tutorial: Finance Payment Calculations," obtained from http://www.leaselink.com/, generated Nov. 24, 2004, 41-pages.

"DealerTrack," obtained from http://www.dealertrack.com/, generated Nov. 24, 2004, 5-pages.

"DealerTrack Brochures," obtained from http://www.dealertrack.com/, dated 2004, 6-pages.

"DealerTrack Brochure," obtained from http://www.dealertrack.com/ on Nov. 24, 2004, undated, 1-page.

Webscreens, obtained from http://www.getauto.com/, generated on Nov. 15, 2004, 5-pages.

"Get Auto," obtained from http://www.getauto.com/, generated on Mar. 25, 2005, 16-pages.

Kelly Blue Book via Internet Archive (http://web.archive.org/web1200409131013091www.800bluebook.com/products bb newcar.aspx?nav=/&section=residual.

* cited by examiner

CAR INVENTORY
FILE  EDIT  VIEW  FAVORITES  TOOLS  HELP
ADDRESS

| | |
|---|---|
| YEAR | 2002 |
| MAKE | CADILLAC |
| MODEL | ESCALADE AWD |
| STYLE | 4D WGN |
| CREDIT SCORE | 700 |
| ZIP | 78628 |

PREVIOUSLY TITLED ☑

| | |
|---|---|
| ODOMETER | 38218 |
| ANNUAL MILES | 15000 |
| TERM | 48 |
| MSRP/VALUE $ | 39200 |
| SELLING PRICE $ | 34900 |
| DOWN PAYMENT | |

MOONROOF ☑    LEATHER INTERIOR ☐    CD PLAYER ☑

NEXT STEP: VIEW LEASE OPTIONS    [CONTINUE]

*FIG. 3B*

To view the details of the lease that best fits your needs, click on the Option in the Program field. To view the explanation of any field you have a question about, mouse over the field and the explanation will appear with the information. If you have more detailed questions please contact one of our leasing specialists.

2002 CADILLAC ESCALADE AWD 4d Wgn

| Program | Service | Payment | Money Factor | Residual Value | Mileage Penalty | Due at Signing | Lease Type | Total of Payments |
|---------|---------|---------|--------------|----------------|-----------------|----------------|------------|-------------------|
| Lender A | Detail | $542.69 | 0.00227 | $13741 | 0.18 | $542.69 | Closed End | $27677 |
| Lender B | Detail | $569.59 | 0.00227 | $13741 | 0.18 | $569.59 | Closed End | $27340 |
| Lender C | Detail | $579.18 | 0.00350 | $15266 | 0.15 | $579.18 | Closed End | $29538 |
| Lender D | Detail | $606.26 | 0.00354 | $15266 | 0.15 | $606.26 | Closed End | $29100 |

NEXT STEP: SELECT YOUR LEASE BY CLICKING ON IT

CAR INVENTORY
FILE   EDIT   VIEW   FAVORITES   TOOLS   HELP
⇐ ⇒   ADDRESS [        ]

232 → PROGRAM INFORMATION

Payment [542.69]   Total Due at Signing [542.69]   Term [51]   Residual [13741]

Purchase Price [34900]   Total of Payments [27677.19]   MSRP/CRV [39200]

234 → 2002 CADILLAC ESCALADE AWD 4d Wgn
LENDER A

Cap Cost Reduction [0.00]         Mileage Allowance [15000]
Disposition Fee [395.00]           Excess Mileage Fee [0.18]
Acquisition Fee [795]              Money Factor [0.00227]
Purchase Option [14091]            Security Deposit [0]

*** All Leases include GAP Insurance.

NEXT STEP: APPLY FOR LEASE       [CONTINUE]

*FIG. 5*

AUTOMATED SYSTEM AND METHOD FOR PROVIDING LEASE PAYMENT INFORMATION TO CONSUMERS VIA THE INTERNET

CROSS-REFERENCE TO RELATED APPLICATIONS

This is a continuation of U.S. appl. Ser. No. 11/089,675, filed 25 Mar. 2005, which is incorporated herein by reference in its entirety and to which priority is claimed.

FIELD OF THE INVENTION

The subject matter of the present disclosure relates to a system and method for advertising a vehicle lease to a consumer via the Internet by preparing on-line, real-time lease payment information with regulation "M" disclosures on Internet web sites.

BACKGROUND OF THE INVENTION

To advertise vehicle leases over the Internet, it is known in the art to provide consumers with estimated lease payments for non-specific vehicles. In one prior art example, LeaseStar.com (http://www.leasestar.com) has offered a lease quoting engine for dealers via the Internet since about 2000. LeaseStar.com uses ADP's w.e.b.Desking, which offers lease quoting via an Internet-based system available to dealers nationwide.

In another prior art example, LeaseCompare.com (http://www.leasecompare.com) has offered lease quoting since about 2001. Using LeaseCompare.com, a consumer can compare estimated lease payments for non-specific vehicles via the Internet. The consumer fills in fields of a webpage by selecting the year, make, model, and style of a vehicle. The consumer also enters a credit score, an odometer reading, and mileage allowance. Furthermore, the consumer enters the sticker price of the vehicle, the selling price (i.e, the negotiated price) of the vehicle, and the down payment. When the consumer selects a vehicle make, model, and style, available options can be displayed for selection by the consumer. Also, the base current retail value is automatically input for the selected vehicle. Based solely on the entries made by the consumer, LeaseCompare.com determines lease quotes for the vehicle specified by the consumer. Each quote represents an offer from a lender. By clicking on a quote, the consumer is given a webpage of disclosure details, which include the term, mileage allowance, residual value, money factor, mileage penalty, gap insurance, acquisition fee, purchase option, security deposit, disposition fee, and total due at signing from the disclosure details webpage, the consumer can access a webpage to apply for credit.

Automobile dealers and others advertise estimated lease payments via the Internet because advertising actual vehicle lease payments on a specific vehicle over the Internet presents a number of challenges. For example, several variables that change with market conditions are required to calculate accurate vehicle lease payments. The variables include vehicle residual values, money factors, lending program guidelines, consumer credit ratings, consumer location, and attributes of the vehicle (e.g., odometer reading, age, options, etc.). Furthermore, vehicle lease payments must be advertised with federal disclosure information. Regulation "M" (12 C.F.R. §213.7) implements the consumer leasing provisions of the Truth in Lending Act and requires meaningful disclosure of leasing terms advertised to consumers. Under the consumer-focused legislation of Regulation M, automobile dealers must properly disclose actual numbers of all the factors used to calculate a lease payment. Due to these challenges, automobile dealers and others may find that advertising actual lease payments to consumers on specific vehicles in a dealer's inventory via the Internet to be too complicated and may simply elect not to advertise actual vehicle leases to consumers via the Internet. Therefore, a need exists for a system and method that allows automobile dealers and others to advertise vehicle leases on specific vehicles to consumers via the Internet.

The subject matter of the present disclosure is directed to overcoming, or at least reducing the effects of, one or more of the problems set forth above.

BRIEF DESCRIPTION OF THE DRAWINGS

The preferred embodiments and other aspects of subject matter of the present disclosure will be best understood with reference to a detailed description of specific embodiments, which follows, when read in conjunction with the accompanying drawings, in which:

FIG. 3B illustrates an exemplary webpage generated by the disclosed system for displaying information for a specific vehicle used to calculate lease payment information for a consumer.

FIG. 4 illustrates an exemplary webpage generated by the disclosed system for displaying a plurality of lease payment options from various lease funding services.

FIG. 5 illustrates an exemplary webpage generated by the disclosed system for displaying a detailed disclosure of a selected vehicle lease.

Figure 1:
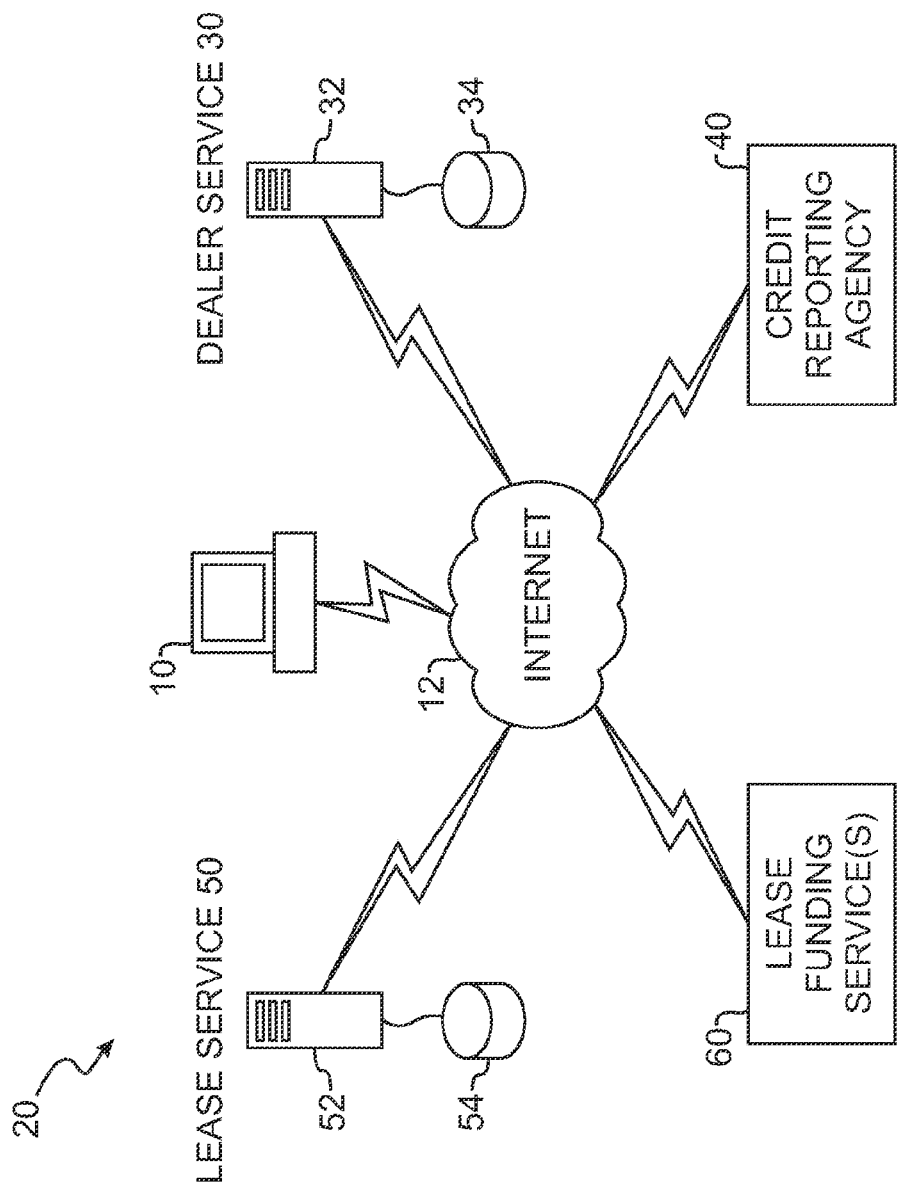
FIG. 1 illustrates an embodiment of an automated system for providing lease payment information to consumers via the Internet according to certain teachings of the present disclosure.

While the disclosed system and method are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. §112.

DETAILED DESCRIPTION

Referring to FIG. 1, an embodiment of an automated system 20 for providing lease payment information to consumers via the Internet 12 is schematically illustrated according to certain teachings of the present disclosure. The system 20 includes a dealer service 30 and a lease service 50. The dealer service 30 uses the lease service 50 to generate accurate lease payment information for vehicles in the dealer's inventory. The lease payment information is calculated using a number of variables, such as the model and year of a vehicle, the structure of lease parameters (e.g., term of the lease, mileage allowance, and sales price), the vehicle's residual value, and a customer's credit worthiness. These variables are interrelated and can be difficult to determine on a deal by deal basis. The lease service 50, however, simplifies the calculation and presentation of accurate lease payment information for the dealer service 30. In addition, the lease service 50 allows the dealer service 30 to integrate lease payment information and related disclosures from the lease service 50 into the dealer's Internet website. As a result, the dealer service 30 can accurately advertise and disclose lease payment information on specific vehicles in the dealer's inventory to consumers via the Internet 12.

In one embodiment, the dealer service 30 and the lease service 50 are implemented on one or more common servers and share common databases. In another embodiment and as shown in FIG. 1, the lease and dealer services 30 and 50 are implemented on different servers. In this embodiment, the dealer service 30 hosts a website implemented at a server 32 and has one or more databases 34 for storing the dealer's vehicle inventory and other information. The lease service 50 has a server 52 and has one or more databases 54 for storing information. The servers 32 and 52 are connected to the Internet 12 using conventional techniques so that the services 30 and 50 can exchange information.

Using a personal computer 10 having a web browser or the like, a consumer can access the dealer's website hosted at the dealer's server 32 via the Internet 12. At the dealer's website, the consumer can perform various activities, such as view the dealer's vehicle inventory stored in database 34. When the consumer requests leasing information on one or more specific vehicles in the dealer's inventory, the dealer's service 30 uses the lease service 50 to provide automated lease payment information to the consumer. Via the Internet 12, the lease service 50 receives information from the dealers' service 32 and database 34. The information includes vehicle information related to one or more specific vehicles in the dealer's inventory stored in database 34. The vehicle information can include the vehicle identification number (VIN), odometer reading, sales price, style, and options, etc. of the vehicles. The information also includes lease and consumer information related to the consumer requesting the vehicle lease and related to specific terms for the vehicle lease. The lease and consumer information can include the consumer's credit score, the consumer's location (e.g., ZIP code), the term of lease, the annual lease miles, etc.

Once the lease service 50 receives the information from the dealer service 30, the lease service calculates lease payment information in an automated fashion based on the information from the dealer service 30 and lease guidelines from one or more lease funding services 60. Typical lease funding services 60 include automobile dealer manufacturers and third party financial institutions. The lease service 50 subscribes to a plurality of these lease funding services 60. The lease funding services 60 can periodically update its guidelines with the lease service 50, and the lease service 50 can store the guidelines in its database 54. After calculating the lease payment information, the lease service 50 returns information and/or webpage links to the dealer service 30 for use or incorporation into the website hosted at the dealer's server 32.

Preferably, URL links are used between the servers 32 and 52 to transfer the information between the services 30 and 50 via the Internet 12. For example, the server 52 for the lease service 50 uses URL links from the dealer service 30 to obtain information from the dealer's server 32 and database 34 for the dealer's website. The URL links use URL web service calls and returns inside HTML code and can be implemented into the dealer's website. The lease service 50 receives the information from the dealer service 30 and generates estimated or certified lease payment information, which is returned to the dealer service 30. The returned lease payment information can be integrated into web pages on the dealer's website and can be displayed with required disclosure pages for the consumer. The lease service 50 can also provide URL reference links for lease payment information and disclosure web pages hosted at the lease server 52.

For the purposes of example, a URL link for providing information between services 30 and 50 for an example vehicle of a 2002 Escalade can be http://www.website of lease service /SVCquote.php?VIN= 1GYEK63NO2R211489&Odometer=38218&Beacon= 700&Ter m=48&Miles= 15&Purchase=34900&Template=extended txt &ST= FA14A4FA-7705-4A9D-A252-A5C05CB46083. This URL link calls the lease service 50 using the dealer supplied vehicle and lease information, which includes the VIN, odometer reading, beacon score, term of the lease, mileage for the lease, and purchase price for calculating lease payments. The value for beacon score can be the credit rating for a specific customer or can be the credit rating provided by the dealer for a typical customer. The term is the lease term for the customer. The lease service 50 may be configured to find the lowest lease payment, which could involve a few months longer than the designated term (e.g., 51-months is one example for a designated 48-month term).

The URL call also includes a template designation. In the present example, the template designation is "extended_txt." This designation tells the lease service 50 to send back calculated information for the lowest lease payment, a first hyperlink URL for a disclosure, and a second hyperlink URL for a list of competitive lease payments. Other template designations can be made to send back various combinations of this information. A "payment_txt" designation returns the lowest payment value only, a "url_txt" designation returns a URL link to the lowest payment disclosure page only, and a "complete_txt" designation returns the lowest payment value and a URL link to a disclosure webpage for the lowest payment. An "answer_xml" designation in the URL supports the same options and return values as the "template" designation except that they are formatted in XML, which can be processed by a receiving application before presenting it to the consumer at the dealer's website.

The URL link also includes a registration code parameter, which in the present example is ST=FA14A4FA-7705-4A9D-A252-A5C05CB46083. The registration code parameter designates the registration code of the dealer service 30 for accessing the lease service 50. Each dealer service 30 using the lease service 50 is given a unique registration code, which is required to use the service 50 via the URL links.

In another embodiment of the disclosed system 20, the lease service 50 can host the dealer's vehicle inventory on its server 52 and database 54. In this embodiment, the dealer service 30 can regularly update the vehicle inventory information hosted by the lease service 50. When a consumer requests a vehicle eligible for lease in the dealer's inventory, the consumer can be linked to the lease service 50 from the dealer's website and can view the hosted vehicle inventory for the dealer from the lease service's website hosted at server 52.

Figure 2:
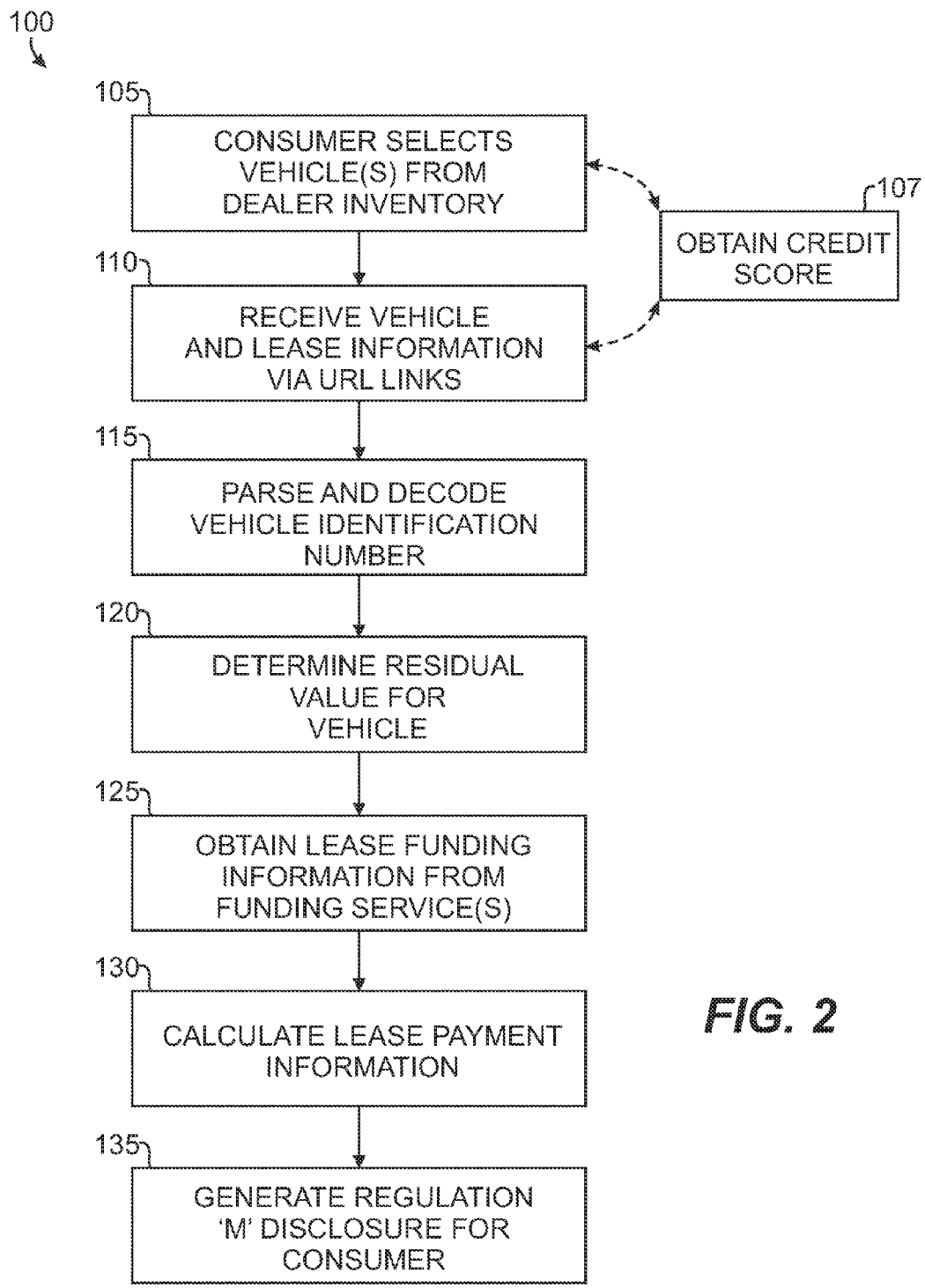
FIG. 2 illustrates operation of the disclosed system in flow chart form.

Referring to FIG. 2, an embodiment of the operation 100 of the disclosed system (20; FIG. 1) is illustrated in flow chart form. During operation 100, the consumer, who has accessed the dealer's website via the Internet, selects one or more vehicles from the dealer's inventory stored in the dealer's database (34; FIG. 1) (Block 105). The lease service (50; FIG. 1) receives the vehicle and lease information from the dealer's service (30; FIG. 1) via URL links (Block 110).

The lease information is required to calculate lease payments for the vehicles. The lease information includes the customer's credit score, customer's zip code, the term of the lease, and the annual mileage for the lease. The values for the customer information will vary based on the customer who is seeking to lease a vehicle. If an estimated lease payment is to be generated on a vehicle for a customer, a dealer can provide a representative value of a credit score based on the dealer's customer base, the customer can provide an estimated credit score, or a similar procedure can be used to provide a representative credit score. Otherwise, an actual credit score for a specific customer can be used when providing the customer with lease information. In this regard, the disclosed system can use any of the techniques known in the art for electronically obtaining a consumer's credit score from a credit reporting agency (40; FIG. 1) (Block 107).

The vehicle information is related to attributes of specific vehicles in the dealer's inventory, which are stored in the dealer's database (34; FIG. 1) or hosted on the lease service's database (54; FIG. 1). The vehicle attributes are required to determine a vehicle's correct residual value for calculating the lease payments. The vehicle attributes include year, make, model, odometer reading, sales price, style, and option(s) of the vehicle. In a preferred embodiment, the vehicle information includes only the vehicle identification number (VIN) for the vehicle rather than including separate data for the year, make, model, and style of the vehicle. If an estimated lease payment is to be generated on the vehicle, the style and option attributes may not be required. Otherwise, the style and option attributes are required when providing the customer with a "certified" lease payment, as described later.

In a preferred embodiment, the lease service parses and decodes the VIN for the vehicle to identify the year, make, model, and style of the vehicle (Block 115). The disclosed system can use VIN parsing and decoding processes known in the art. By decoding the VIN, the disclosed system can reduce the amount of vehicle information required to be transferred to the lease service (50; FIG. 1) from the dealer service (30; FIG. 1) via URL links and/or required to be stored in the databases (34, 54; FIG. 1). In addition, the process of converting the VIN into the year, make, model, and style of a particular vehicle is a time saving process and reduces the amount of information on the vehicles that must be stored in the dealer database (34; FIG. 1), manually entered, etc. The details of the VIN parsing and decoding process include extracting and interpreting each of the first ten characters of the VIN. Depending on the position of the characters, each character or group of characters in the VIN is compared to a table of industry standard values, which is then used to identify the year, make, model, and style of the vehicle.

The industry standard vehicle attributes or data are used as inputs to determine a total residual value of the vehicle (Block 120). For example, an industry standard table of residual values can be used to assign the total residual value to the vehicle based on the vehicle's attributes. The lease service (50; FIG. 1) then obtains lease program guidelines and other information from lease funding service(s) (60; FIG. 1) (Block 125). The lease program guidelines can be stored by the lease service on its database (54; FIG. 1) or can be directly obtained from lease funding service (60; FIG. 1) via the Internet when requested. The lease program guidelines include the particular lease calculation techniques used by the funding services, payment ceilings, rate tables, and other information from the funding services on how they evaluate and calculate lease payments.

The lease service (50; FIG. 1) then uses calculation techniques known in the art based on the industry standard vehicle residual data, lease program guidelines, lease rates, consumer credit rating, industry standard vehicle information, and the consumer's location (e.g., ZIP code) to determine lease payment information (Block 130). Finally, the lease service (50; FIG. 1) generates a Regulation "M" disclosure (12 C.F.R. §213.7) for display to the consumer (Block 135). As a result of the above operation 100, the consumer can view the lease payment information on a specific vehicle in a dealer's inventory, online and in real-time, and in a format that includes the details required by Regulation "M."

Figure 3A:
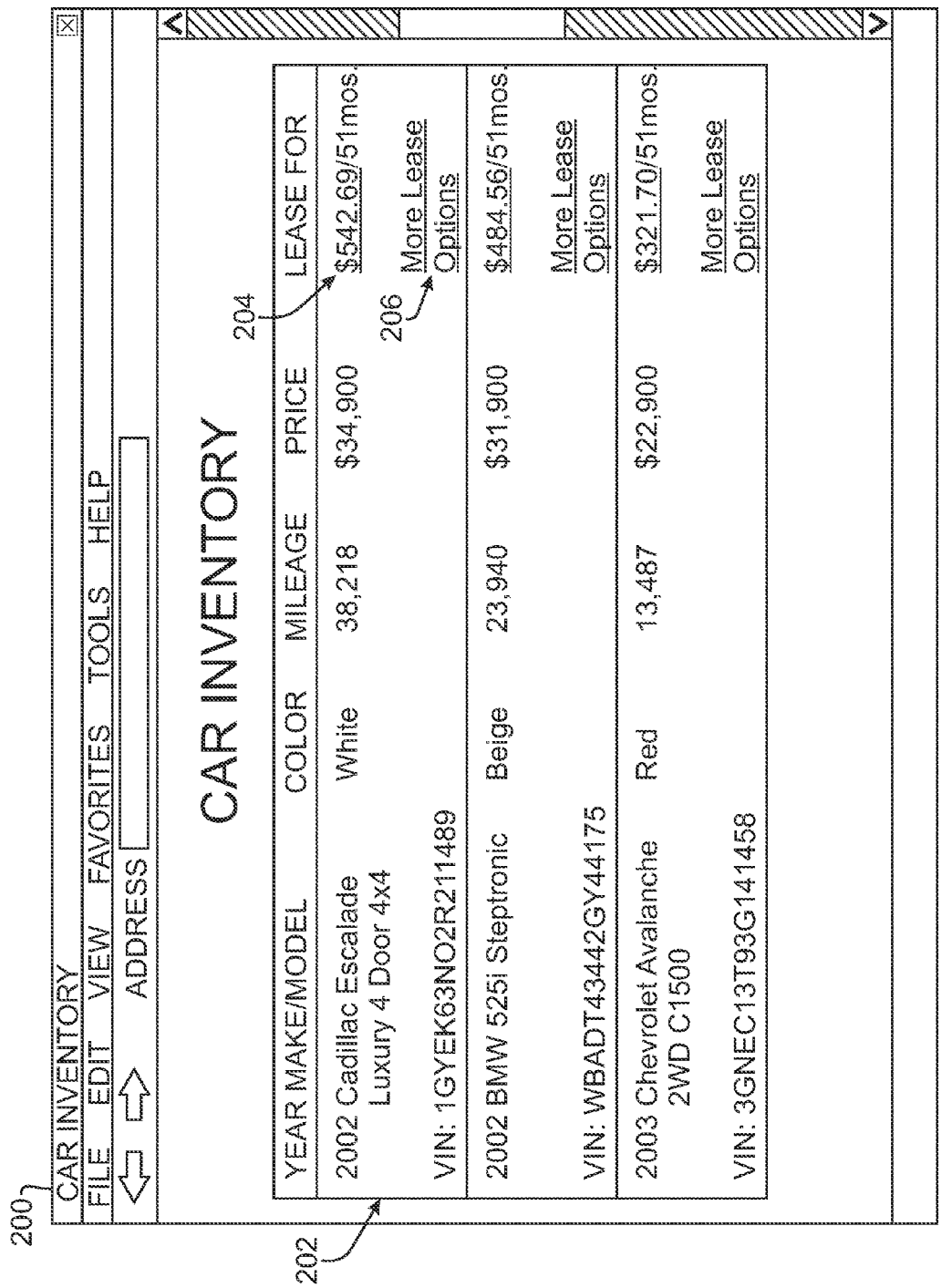
FIG. 3A illustrates an exemplary webpage generated by the disclosed system for displaying the lowest lease payment option for various vehicles.

Referring to FIG. 3A, an exemplary webpage 200 generated by the disclosed system is illustrated. This webpage 200 can be implemented at the dealer's website and can be used to advertise estimated lease payments for vehicles in the dealer's inventory. The webpage 200 has a table 202 showing accurate, estimated lease payment information for various vehicles in a dealer's inventory. Details of the vehicles in the dealer's inventory are shown with calculated lease payments 204, which in the present example are the lowest of a number of available lease payments for each vehicle. In this exemplary webpage 200, the year, make, model, color, mileage, VIN, and sales price are displayed along with the lowest lease payment for the vehicles. The actual format for presenting the information can be left to the dealer and the web content designer for the dealer's website. In this way, the dealer can keep the existing design of their website while being able to add the advertised lease payment and disclosure information provided by the lease service (50; FIG. 1).

By selecting the hyperlinked value 204 for the lowest lease payment in the table 202, the consumer can access a hyperlinked webpage for displaying a Regulation M disclosure for the selected lease payment option. Such a disclosure webpage is discussed below with reference to FIG. 5. By selecting the hyperlinked "more lease options" 206 for the lease payment, the consumer can access another hyperlinked webpage for displaying lease payment information from multiple funding programs together. Such a multiple funding program webpage is discussed below with reference to FIG. 4.

Referring to FIG. 3B, an exemplary webpage 210 generated by the disclosed system is illustrated. This webpage 210 can be used to enter information for a lease and for a vehicle in the dealer's inventory. The webpage 210 can be used for those vehicles where the VIN does not fully describe the year, make, model and style of the vehicle. The webpage 210 can also be used to add vehicle options for calculating "certified" lease payments. The VIN of a vehicle does not typically describe the options on a particular vehicle, such as moon roof, leather interior, CD player, etc. The webpage 210 has dropdown and data entry fields for entering specific information related to a particular vehicle and lease. These fields may be pre-populated with information stored in the dealer's database (34; FIG. 1) or may be manually input with information by the dealer or the consumer depending on the implementation of the disclosed system.

The difference between an estimated lease payment and a certified lease payment is the amount of lease and vehicle information provided to the lease service (50; FIG. 1) and used to calculate the lease payment information. With the webpage 210 in FIG. 3B, the vehicle and lease information can be "customized" for each vehicle in the dealer's inventory. This allows for a fuller description of a vehicle including its style and options to the lease service (50; FIG. 1). It also allows for more accurate lease information based on a typical customer who leases a specific vehicle or based on an actual credit score of a given customer. Although the exemplary webpage 210 of FIG. 3B implies that entering detailed information of a particular vehicle and lease is done manually with the fields on the webpage 210, it is understood that the detailed information can already be stored in the dealer's database (34; FIG. 1) and can be automatically provided to the lease service (50; FIG. 1) using URL links and other techniques disclosed herein.

Referring to FIG. 4, an exemplary webpage 220 generated by the disclosed system is illustrated. This webpage 220 displays a plurality of lease payment options 222 calculated for various lease funding services and a specific vehicle. Each of the lease payment options 222 is shown with a program name, lease payment, money factor, residual value, mileage penalty, money due at signing, lease type, and total amount of payments. This webpage 220 can be accessed from the hyperlinked "more lease options" 206 of webpage 200 of FIG. 3A or can be produced after selecting "continue" from webpage 210 of FIG. 3B. The "service" link 224 at the top of the second column is a web service URL, which will return the lowest lease payment, the URL link to the detail disclosure page and the URL link to this page of lowest competitive lease payments available, similar to those shown in FIG. 3A. Due to all the information provided on this webpage 220, it may meet the Regulation "M" standards for disclosure.

Referring to FIG. 5, an exemplary webpage 230 generated by the disclosed system is illustrated. This webpage 230 displays a Regulation "M" disclosure of a selected vehicle lease. The disclosure webpage 230 includes program information 232 and lease payment information 234 for a selected lender and a specified vehicle in the dealer's inventory. The disclosure webpage 230 allows dealers to display and consumers to view actual lease payments with full Regulation M advertising disclosure. The disclosure webpage 230 can be accessed by selecting a hyperlinked payment on webpage 200 of FIG. 3A or by selecting a hyperlinked lender on webpage 220 of FIG. 4.

The disclosure webpage 230 preferably satisfies the prominence rule in 12 C.F.R. §213.7(b) (1) of the Consumer Leasing Act by providing both the triggering terms and the required disclosures in the same location so that they can be viewed simultaneously by a consumer. The disclosure webpage 230 also preferably satisfies the "clear and conspicuous" standard as it relates to the disclosure of: a) the amount of any payment; b) a statement of any capitalized cost reduction or other payment (or that no payment is required) prior to or at consummation or by delivery, if delivery occurs after consummation; c) that the transaction advertised is a lease; d) the total amount due prior to or at consummation or by delivery, if delivery occurs after consummation; e) the number, amounts, and due dates or periods of scheduled payments under the lease; f) a statement of whether or not a security deposit is required; and (g) a statement that an extra charge may be imposed at the end of the lease term where the lessee's liability (if any) is based on the difference between the residual value of the leased vehicle and its realized value at the end of the lease term.

Using the disclosure webpage 230, the consumer can print and/or save the disclosure as required by the E-Sign Act. The disclosure webpage 230 also preferably addresses the "Timing and Effective Delivery" requirement of the Consumer Leasing Act by requiring the lessee to access the disclosures before becoming obligated under a lease. During operation of the disclosed system, the consumer cannot bypass the disclosure webpage 230 before becoming obligated.

The disclosure webpage 230 can be updated to keep the disclosure current and reflect the changes that occur in the dealer's inventory, the lease rates, the lease residuals, and the lease program guidelines. Thus, the disclosed system bridges the gap between a dealer's desire to advertise lease payments for their inventory, a consumer's desire to shop for lease information via the Internet, and the government's Regulation M requirements for advertising lease payments. After viewing the disclosure, a consumer can apply for a lease by selecting "Continue," which will produce an online application process to apply for the lease.

Although the present disclosure has focused on the use of the lease service (50; FIG. 1) by an automobile dealer service (30; FIG. 1), it will be appreciated that other entities can use the lease service (50; FIG. 1) to generate lease payment information and Regulation "M" disclosures. For example, the disclosed system (20; FIG. 1) can be used by professional leasing facilitators to accurately advertise and disclose to consumers lease payment information for multiple lease funding services (60; FIG. 1).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An automated method of providing payment information of residual-based vehicle financing to consumers, the method comprising:
   obtaining, with one or more servers, source data related to vehicles from one or more sources by electronically receiving the source data from the sources via URL web service calls and returns inside HTML code over the Internet, the source data comprising vehicle data, consumer data, and residual-based finance data, the vehicle data comprising vehicle information, a price, and an odometer reading for each of the vehicles;
   determining, with the one or more servers, a residual value of each of the vehicles using the vehicle information, the price, and the odometer reading of each of the vehicles as inputs in the residual value determinations;
   obtaining, with the one or more servers, funding information for residual-based vehicle financing from one or more third parties;
   calculating, with the one or more servers, payment information based on the residual values, the residual-based finance data, the consumer data, and the funding information; and
   enabling viewing of the payment information by the consumers via the Internet by generating, with the one or more servers, disclosures of the payment information.

2. The method of claim 1, wherein the vehicles from the one or more sources comprises specific vehicles in inventory.

3. The method of claim 1, wherein the vehicle information comprises one or more of: a style of the vehicle; one or more options of the vehicle; a year of the vehicle, a make of the vehicle; a model of the vehicle; an identifier of the vehicle; and a vehicle identification number.

4. The method of claim 1, wherein the vehicle information lacks a style of the vehicle, and wherein the method further comprises deriving the style of the vehicle from other elements of the vehicle information.

5. The method of claim 1, wherein the residual-based finance data comprises a term of a lease and an annual mileage for the lease.

6. The method of claim 1, wherein the consumer data comprises a credit score and a location.

7. The method of claim 1, wherein determining the residual value of each of the vehicles comprises electronically assigning the residual values from an industry standard table of residual values based on the vehicle data.

8. The method of claim 1, wherein obtaining the funding information for residual-based vehicle financing from the one or more third parties comprises electronically receiving lease program guidelines from automobile dealer manufacturers or third party financial institutions via the Internet.

9. The method of claim 1, wherein the act of calculating the payment information based on the residual values, the residual-based finance data, the consumer data, and the funding information comprises electronically calculating lease payment information based on the residual values, lease program guidelines, lease rates, consumer credit ratings, industry standard vehicle information, and location of the consumers.

10. The method of claim 1, wherein generating the disclosures of the payment information comprises electronically formatting the disclosures to conform to a Regulation "M" disclosure notice for vehicle lease payments.

11. The method of claim 1, wherein generating the disclosures of the payment information comprises electronically generating one or more hyperlinks to one or more disclosure webpages for incorporation into a website.

12. The method of claim 1, wherein obtaining the consumer data comprises:
obtaining credit scores of the consumers from one or more third party services; and
storing the credit scores as the consumer data for the consumers.

13. A system for providing automated payment information of residual-based vehicle financing to consumers from one or more sources via the Internet, the one or more sources implemented at one or more first servers having one or more first databases, the one or more first databases storing source data including vehicle data, consumer data, and residual-based finance data, the vehicle data comprising vehicle information, a price, and an odometer reading for each of the vehicles, the system comprising:
one or more second databases; and
one or more second servers communicatively coupleable to the one or more second databases, the one or more second servers configured to:
interface with the one or more first servers via the Internet;
electronically receive the source data related to the vehicles from the one or more sources via URL web service calls and returns inside HTML code over the Internet;
determine a residual value of each of the vehicles using the vehicle information, the price, and the odometer reading of each of the vehicles as inputs in the residual value determinations;
obtain funding information for residual-based vehicle financing from one or more third parties;
calculate payment information based on the residual values, the residual-based finance data, the consumer data, and the funding information;
generate disclosures of the payment information; and
make the disclosures available for viewing by the consumers via the Internet.

14. The system of claim 13, wherein the vehicles from the one or more sources comprises specific vehicles in inventory.

15. The system of claim 13, wherein the vehicle information comprises one or more of: a style of the vehicle; one or more options of the vehicle; a year of the vehicle, a make of the vehicle; a model of the vehicle; an identifier of the vehicle; and a vehicle identification number.

16. The system of claim 13, wherein the vehicle information lacks a style of the vehicle, and wherein the system further comprises deriving the style of the vehicle from other elements of the vehicle information.

17. The system of claim 13, wherein the residual-based finance data comprises a term of a lease and an annual mileage for the lease.

18. The system of claim 13, wherein the consumer data comprises a credit score and a location.

19. The system of claim 13, wherein to determine the residual value of each of the vehicles, the one or more second servers are configured to electronically assign the residual values from an industry standard table of residual values based on the vehicle data.

20. The system of claim 13, wherein to obtain the funding information for residual-based vehicle financing from the one or more third parties, the one or more second servers are configured to electronically receive lease program guidelines from automobile dealer manufacturers or third party financial institutions via the Internet.

21. The system of claim 13, wherein to calculate the payment information based on the residual values, the residual-based finance data, the consumer data, and the funding information, the one or more second servers are configured to electronically calculate lease payment information based on the residual values, lease program guidelines, lease rates, consumer credit ratings, industry standard vehicle information, and location of the consumers.

22. The system of claim 13, wherein to generate the disclosures of the payment information, the one or more second servers are configured to electronically format the disclosures to conform to a Regulation "M" disclosure notice for vehicle lease payments.

23. The system of claim 13, wherein to generate the disclosures of the payment information, the one or more second servers are configured to electronically generate one or more hyperlinks to one or more disclosure webpages for incorporation into one or more websites hosted on the one or more second servers.

24. The system of claim 13, wherein to obtain the consumer data, the one or more second servers are configured to:
obtain credit scores of the consumers from one or more third party services; and
store the credit scores as the consumer data for the consumers.

* * * * *